United States Patent Office

2,720,534
Patented Oct. 11, 1955

2,720,534

DIKETOBISNORCHOLENIC ACID AND ESTERS THEREOF AND PROCESS

Peter D. Meister, Kalamazoo, and Robert H. Levin, Kalamazoo Township, Kalamazoo County, Mich., assignors to The Upjohn Company, Kalamazoo, Mich., a corporation of Michigan No Drawing. Application August 11, 1952,
Serial No. 303,838

9 Claims. (Cl. 260—397.1)

The present invention relates to novel steroids and more particularly to 3,11-diketobisnor-4-cholenic acid and esters thereof.

The compounds of the present invention are represented by the formula:

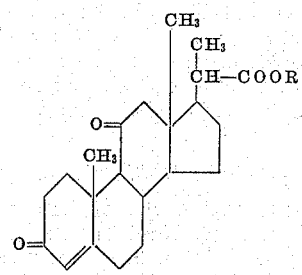

wherein R is selected from the group consisting of hydrogen and hydrocarbon radicals containing up to and including eight carbon atoms.

It is an object of the present invention to provide the novel 3,11-diketobisnor-4-cholenic acid and esters thereof, which compounds are useful as intermediates in the preparation of cortisone. Other objects will be apparent to those skilled in the art to which this invention pertains.

The 3,11-diketobisnor-4-cholenic acid of the present invention is readily converted to the pharmacologically active cortisone. In the conversion process, 3,11-diketobisnor-4-cholenic acid is converted to 11-ketoprogesterone [Peterson et al., J. Am. Chem. Soc., 74, 1871 (1952)] by reacting the novel 3,11-diketobisnor-4-cholenic acid with ethyl mercaptan to produce the thiol ester of the 3,11-diketobisnor-4-cholenic acid. The thiol ester is treated with Raney nickel which has been deactivated by reaction with acetone to form the 22-aldehyde which is reacted with a secondary amine, e. g., with piperidine in benzene in the presence of para-toluenesulfonic acid, the thus-produced enamine is ozonized with ozone and the resulting ozonide is split with zinc in acetic acid to produce 11-ketoprogesterone. The resulting 11-ketoprogesterone is hydrogenated in the presence of a palladium-charcoal catalyst to yield pregnane-3,11,20-trione and reduction of pregnane-3,11,20-trione with sodium borohydride produces 3α-hydroxypregnane-11,20-dione. Utilizing 3α-hydroxypregnane-11,20-dione as the starting material in the procedure described by Kritchevsky et al. [J. Am. Chem. Soc., 74, 483 (1952)] results in the preparation of the pharmacologically active cortisone. The more stable esters are likewise utilizable in the process described after a preliminary hydrolysis to the free acid.

The free acid, 3,11-diketobisnor-4-cholenic acid, is prepared by the concomitant oxidation of the 22-primary hydroxy and 11-secondary hydroxy of 3-ketobisnor-4-cholen-11α,22-diol to a carboxylic radical and a keto group, respectively. The 3-ketobisnor-4-cholen-11α,22-diol is prepared by subjecting 3-ketobisnor-4-cholen-22-al [Heyl et al., J. Am. Chem. Soc., 72, 2617 (1950)] to the oxygenating action of a culture of fungus of the order Mucorales as described by Murray and Peterson, Patent No. 2,602,769, issued July 8, 1952, in Example 34.

According to the process of the present invention, the oxidation is usually conducted in a homogeneous or heterogeneous solvent system. In the homogeneous solvent system, the starting 3-ketobisnor-4-cholen-11α,22-diol is dissolved in a solvent such as, for example, glacial acetic acid, oxidized with a suitable oxidizing agent such as, for example, potassium permanganate, N-bromosuccinimide, chromic acid, or the like. The heterogeneous solvent system utilizes a water immiscible solvent such as, for example, methylene chloride, chloroform, benzene, ethylene dichloride, or the like, in conjunction with a water solution of the oxidizing agent. The oxidizing agent utilized in the present process is usually used in a ratio of about one mole of steroid to about two moles of oxidizing agent. The oxidation is usually conducted at about room temperature although other temperatures between about zero degrees centigrade and the boiling point of the reaction mixture may also be employed. The reaction time may be varied with the oxidizing agent and the temperature employed. The solvent may then be removed by distillation under reduced pressure and the product precipitated by the addition of water which procedure retains in solution any inorganic salts present. The resulting 3,11-diketobisnor-4-cholenic acid may then be purified, filtered, and recrystallized from a suitable solvent such as, for example, acetone, or by chromatographic separation according to procedure known in the art.

The preparation of the esters of the present invention involves dissolving the 3,11-diketobisnor-4-cholenic acid in a suitable solvent, e. g., methanol, methylene chloride, ethanol, isopropanol, chloroform, or the like and thereupon adding to the solution an esterifying diazoalkane, prepared according to the process disclosed by Wilds et al. [J. Org. Chem., 13, 763 (1948)], containing suitably up to eight carbon atoms, e. g., diazomethane, diazoethane, diazohexane, diazooctane, or the like, to produce the desired alkyl ester of 3,11-diketobisnor-4-cholenic acid. Due to the explosive characteristics of the compounds employed in the preparation of the diazoalkanes, extreme caution should be exercised. The esters may also suitably be prepared by reacting the 3,11-diketobisnor-4-cholenic acid with an alcohol, e. g., primary alcohols such as methanol, ethanol, isopropanol, or secondary alcohols, in the presence of a suitable acid catalyst, e. g., a mineral acid or an organic sulfonic acid. Representative catalyst are the meta and para-toluenesulfonic acids, naphthalenesulfonic acid, benzenesulfonic acid, ortho-chlorobenzenesulfonic acid, hydrochloric acid, and sulfuric acid. Similarly aromatic alcohols such as benzyl alcohol phenylethyl alcohol, or the like, can be employed to produce esters such as benzyl 3,11-diketobisnor-4-cholenate, phenylethyl 3,11-diketobisnor-4-cholenate, and the like.

The following examples will serve to illustrate the process and products of this invention, but the said invention is not to be considered as limited thereto.

*Example 1.—3,11-diketobisnor-4-cholenic acid*

A 483 milligram sample of 3-ketobisnor-4-cholen-11α, 22-diol, dissolved in ten milliliters of glacial acetic acid, was oxidized with 305 milligrams of chromium trioxide dissolved in one milliliter of water and five milliliters of glacial acetic acid, and the reaction mixture maintained at room temperature for six hours. Twenty-five milliliters of ethanol was added to remove the excess chromic acid. Upon cooling the solution to five degrees centigrade, five percent sodium hydroxide was added to adjust the pH to eleven and the solution thereupon extracted with three fifty-milliliter portions of methylene chloride. The methylene chloride extracts were washed twice with twenty-five milliliters of water, dried over ten grams of sodium sulfate, and evaporated to yield 156 milligrams of oily residue. The remaining alkaline solution was chilled, acidified with ten percent hydrochloric acid to a pH of two and extracted with three fifty-milliliter portions of methylene chloride. The extracts were washed three times with thirty-milliliter portions of water, dried over sodium sulfate, and evaporated to dryness to yield 221 milligrams of crystals. Recrystallization of fifty milligrams of the produced crystals from five milliliters of acetone gave 3,11-diketobisnor-4-cholenic acid with a melting point of 244 to 246 degrees centigrade. Optical rotation $[\alpha]_D^{23}$ was plus 137 degrees (1.024 grams in methanol); ultra violet extinction $k_{239}$ was 36.99.

Analysis.—Calculated for $C_{22}H_{30}O_4$: C, 73.71; H, 8.44. Found: C, 73.51; H, 8.29.

Example 2.—Methyl 3,11-diketobisnor-4-cholenate

A 657.0 milligram sample of 3,11-diketobisnor-4-cholenic acid was dissolved in twenty milliliters of methanol and ten milliliters of methylene chloride and to this mixture was added an ethereal solution of freshly prepared diazomethane, added dropwise, until the yellow color persisted. After remaining at room temperature for half an hour, the solvents were evaporated under reduced pressure to give a crystalline residue which was dissolved in five milliliters of acetone, and the resulting mixture concentrated, diluted with two milliliters of hexane, and chilled in the refrigerator to minus eighteen degrees centigrade. The first crop of crystals weighed 189.0 milligrams and melted at 176 to 177.5 degrees centigrade. From the filtrate a second crop of crystals, weighing 371.5 milligrams and having a melting point of 176 to 178 degrees centigrade, was obtained. The optical rotation $[\alpha]_D^{23}$ was plus 170 degrees (0.654 in chloroform).

Analysis.—Calculated for $C_{23}H_{32}O_4$: C, 74.16; H, 8.66. Found: C, 74.37; H, 8.89.

Example 3.—Ethyl 3,11-diketobisnor-4-cholenate

In the same manner as given in Example 2, using the equivalent proportion of diazoethane in place of diazomethane produced ethyl 3,11-diketobisnor-4-cholenate.

Example 4.—Butyl 3,11-diketobisnor-4-cholenate

In the same manner as given in Example 2, using the equivalent proportion of diazobutane in place of diazomethane produced butyl 3,11-diketobisnor-4-cholenate.

Example 5.—Propyl 3,11-diketobisnor-4-cholenate

In the same manner as given in Example 2, using the equivalent proportion of diazopropane in place of diazomethane produced propyl 3,11-diketobisnor-4-cholenate.

Example 6.—Octyl 3,11-diketobisnor-4-cholenate

In the same manner as given in Example 2, using the equivalent proportion of diazooctane in place of diazomethane produced octyl 3,11-diketobisnor-4-cholenate.

The esters of the present invention are readily converted to the esters of 3,11-diketobisnor-allocholanic acid and 3,11-diketobisnor-cholanic acid as more fully shown in the following examples.

Example 7.—Methyl 3,11-diketobisnor-cholanate 640 milligrams of methyl 3,11-diketobisnor-4-cholenate were dissolved in 75 milliliters of methanol and hydrogenated over 640 milligrams of palladium-cadmium carbonate which had been hydrogenated prior to the addition of the substrate. The uptake of hydrogen at the desired pressure ranging from atmosphere to fifteen pounds per square inch is usually complete after one-half hour as indicated by a definite drop of pressure. After the hydrogenation was complete, the suspension was filtered through a sintered glass funnel; the residual catalyst was washed with 100 milliliters of acetone and the clear solution was chromatographed over a column of 25 grams of a mixture consisting of Darco G 60-celite (1:2) (Table) and fractions of 200 milliliters were collected.

TABLE

| Fraction | Solvent | Eluate Solids Milligrams | |
|---|---|---|---|
| 1 | acetone | 3.5 | |
| 2 | do | 281.0 | |
| 3 | do | 97.5 | |
| 4 | do | 50.0 | |
| 5 | do | 32.5 | Combined |
| 6 | do | 26.0 | |
| 7 | do | 19.0 | |
| 8 | do | 17.0 | |
| 9 | do | 14.5 | |
| 10 | methylene dichloride | 106.0 | |
| 11 | do | 11.5 | Combined |
| 12 | do | 5.5 | |
| 13 | do | 1.5 | |

Fractions two through nine of the chromatogram were recrystallized from chloroform-hexane and two recrystallizations gave 441 milligrams of crystals which had a melting point of 192 to 197 degrees centigrade. A small amount was recrystallized once more to give a crystalline material, methyl 3,11-diketobisnor-cholanate [Lardon et al., Helv. Chim. Acta, 27, 713 (1944)], having a melting point of 200 to 203 degrees centigrade and an optical rotation $[\alpha]_D^{50}$ of plus fifty degrees in acetone.

Analysis.—Calculated for $C_{23}H_{34}O_4$: C, 73.76; H, 9.17. Found: C, 73.63; H, 9.03.

Example 8.—Methyl 3,11-diketobisnor-allocholanate

Fractions ten through twelve of the above mentioned chromatogram were combined and recrystallized from chloroform-hexane. After three recrystallizations 32 milligrams of methyl 3,11-diketobisnor-allocholanate was obtained, having a melting point of 202 to 203.5 degrees centigrade and an optical rotation $[\alpha]_D^{23}$ of plus 55 degrees in acetone.

Analysis.—Calculated for $C_{23}H_{34}O_4$: C, 73.76; H, 9.17. Found: C, 74.08; H, 9.38.

The free acids of the normal and allo esters, 3,11-diketobisnor-allocholanic acid and 3,11-diketobisnor-cholanic acid, may be readily prepared by saponification of the esters with an alkali and subsequent neutralization in the presence of a suitable solvent, as more completely shown in the following examples.

Example 9.—3,11-diketobisnor-cholanic acid

The 3,11-diketobisnor-cholanic acid was prepared by refluxing 182 milligrams of methyl 3,11-diketobisnor-cholanate in twenty milliliters of 1N methanolic potassium hydroxide for two hours. The solution was acidified with dilute hydrochloric acid, extracted with ether, the ether solution extracted with sodium bicarbonate and the sodium bicarbonate extracts acidified with dilute hydrochloric acid to yield 126 milligrams of 3,11-diketobisnor-cholanic acid, which was recrystallized from two milliliters of ether. After two recrystallizations the acid had a melting point of 195 to 200 degrees centigrade and an optical rotation $[\alpha]_D^{23}$ of plus 47 degrees in acetone.

Analysis.—Calculated for $C_{22}H_{32}O_4$: C, 73.30; H, 8.95. Found: C, 73.25; H, 8.89.

Example 10.—3,11-diketobisnor-allocholanic acid

Upon refluxing 60.5 milligrams of methyl 3,11-diketobisnor-allocholanate in ten milliliters of 1N methanolic potassium hydroxide for four hours, acidifying with dilute hydrochloric acid, extracting with ether, extracting the ether solution with sodium bicarbonate, and acidifying the sodium bicarbonate extracts with dilute hydrochloric acid, 49.2 milligrams of 3,11-diketobisnor-allocholanate was obtained, having a melting point of 256 to 258 degrees centigrade and an optical rotation of $[\alpha]_D^{23}$ of plus sixty degrees in acetone.

Analysis.—Calculated for $C_{22}H_{32}O_4$: C, 73.30; H, 8.95. Found: C, 72.83; H, 8.95.

The 3,11-diketobisnor-allocholanic acid and the 3,11-diketobisnor-cholanic acid can be readily converted to the known allopregnane-3,11,20-trione [Steiger et al., Helv. Chim. Acta, 21, 161 (1938)] and pregnane-3,11,20-trione [Hegner et al., Helv. Chim. Acta, 26, 721 (1943)], respectively, by reacting the acids with ethyl mercaptan to produce the thiol esters of the acids. The resulting thiol esters are treated with Raney nickel which has been deactivated by reaction with acetone to form 22-aldehydes, which are reacted with a secondary amine, e. g., with piperidine in benzene in the presence of para-toluenesulfonic acid, the thus-produced enamines are ozonized with ozone, and the resulting ozonides are split with zinc in acetic acid to produce allopregnane-3,11,20-trione and pregnane-3,11,20-trione.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. In a process for the preparation of 3,11-diketobisnor-4-cholenic acid, the step of oxidizing 3-ketobisnor-4-cholen-11a, 22-diol with an oxidizing agent to concomitantly oxidize the 22-primary hydroxy and 11-secondary hydroxy to a carboxylic radical and a keto group, respectively.

2. In a process for the preparation of 3,11-diketobisnor-4-cholenic acid, the step of oxidizing 3-ketobisnor-4-cholen-11a, 22-diol with about two molds of chromic acid per mole of 3-ketobisnor-4-cholen-11a, 22-diol to concomitantly oxidize the 22-primary hydroxy and 11-secondary hydroxy to a carboxylic radical and a keto group, respectively.

3. A process which comprises oxidizing 3-ketobisnor-4-cholen-11a, 22-diol with about two moles of an oxidizing agent per mole of 3-ketobisnor-4-cholen-11a, 22-diol to concomitantly oxidize the 22-primary hydroxy and 11-secondary hydroxy to a carboxylic radical and a keto group, respectively, and thereafter esterifying the 3,11-diketobisnor-4-cholenic acid thus-produced to prepare a 3,11-diketobisnor-4-cholenic acid ester.

4. A compound selected from the group consisting of 3,11-diketobisnor-4-cholenic acid and esters thereof having the formula:

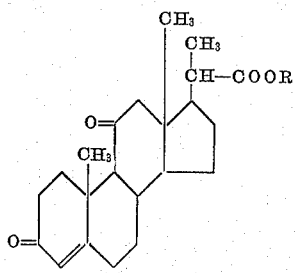

wherein R is selected from the group consisting of hydrogen and hydrocarbon radicals containing up to and including eight carbon atoms.

5. 3,11-diketobisnor-4-cholenic acid having the formula:

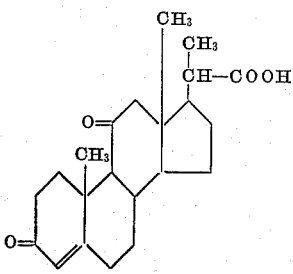

6. Methyl 3,11-diketobisnor-4-cholenate having the formula:

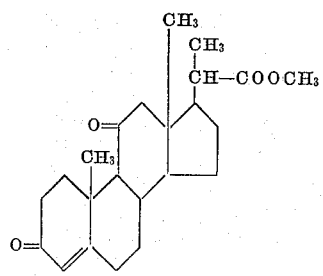

7. Ethyl 3,11-diketobisnor-4-cholenate having the formula:

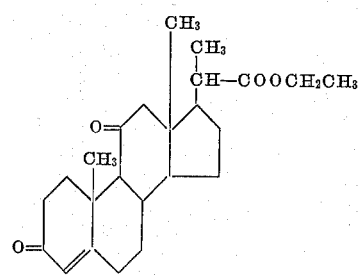

8. Butyl 3,11-diketobisnor-4-cholenate having the formula:

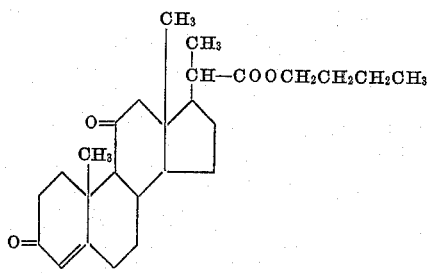

9. Propyl 3,11-diketobisnor-4-cholenate having the formula:

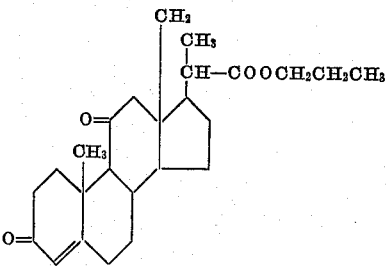

References Cited in the file of this patent
UNITED STATES PATENTS
2,602,769    Murray _____ July 8, 1952